United States Patent Office
3,121,595
Patented Feb. 18, 1964

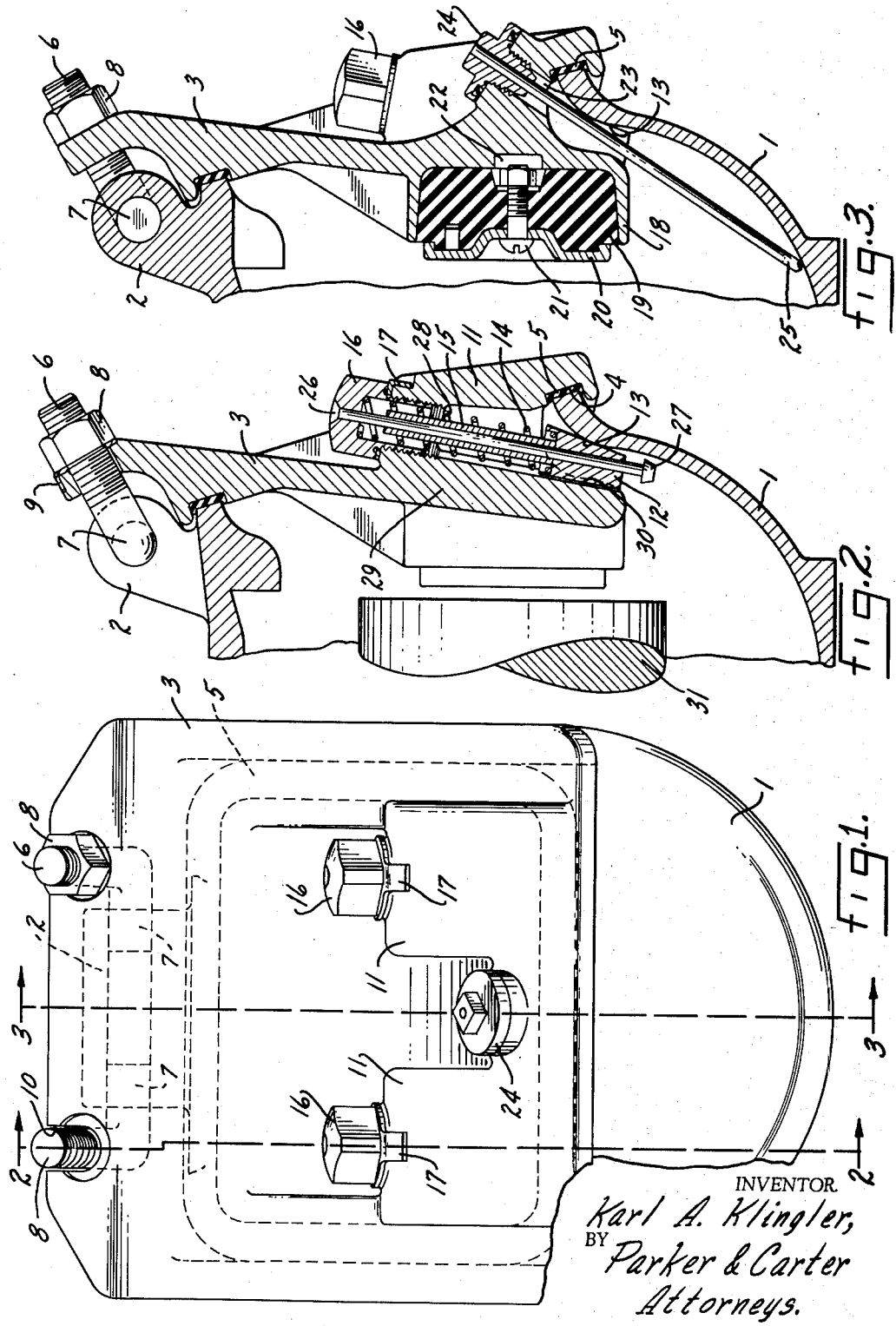

3,121,595
JOURNAL STOP FOR RAILROAD CAR AXLE JOURNAL BOX
Karl A. Klingler, 111 S. Wright, Naperville, Ill.
Filed Feb. 28, 1962, Ser. No. 176,324
13 Claims. (Cl. 308—41)

This invention relates to improvements in lateral journal stop for railroad car axle journal box. It has for one object to provide a journal stop which may be easily and conveniently inserted into and mounted on the conventional car axle journal box without any change in the box structure.

It is important to provide in a railroad car axle journal box means for limiting movement of the journal along a path parallel to the axle thereof. This is of great importance because if the journal works through too great an axial excursion, the journal may lose the seal and loss of lubrication and journal failure will result. Since the car axle with the journal at each end is rigid and since the distance between the journal boxes at either end of the axle are fixed within narrow limits, excessive lateral displacement of the journal or the axle may be prevented by having at each end of the axle a stop. One stop in each of the two boxes associated with the axle.

Another object of the invention is to provide a journal stop which will take the place of the usual car axle journal box lid.

Another object is to provide a journal stop which obviates the necessity of opening and closing the box and makes it easy to lubricate the box without any such opening and closing.

Other objects will appear from time to time throughout the specification and claims.

The invention is illustrated more or less diagrammatically in the accompanying drawings, wherein—

FIGURE 1 is an end view of a railroad car axle journal box showing my invention installed in one box;

FIGURE 2 is a section along the line 2—2 of FIGURE 1;

FIGURE 3 is a section along the line 3—3 of FIGURE 1.

Like parts are indicated by like characters throughout the specification and drawings.

I have illustrated my invention as applied to a single journal box but it will be understood that the two boxes are complementary and one stop will be in the box at one end of the axle and another stop will be in the box at the other end.

The railroad car axle journal box 1 has the usual door or port extending from a little below to well above the axis of the car axle journal. At the top of the box is the usual hinge boss 2 through which normally extends a hinge pin on which the usual cover is hinged. In the proposed structure, the hinge and the usual cover are omitted and there is substituted for this cover a combination lid or closure and lateral axle stop 3. The lid is channeled at 4 about its periphery to receive an elastomeric lid seal 5 which engages the boundary walls of the port to make an oil tight fit when the lid is seated.

Lid bolts 6 terminate at their lower ends in offset hook-like members 7 which engage the boss 2 and are held by nuts 8 against the washers 9 to engage the upper edge of the stop lid which is slotted at 10 for ease in assembly. Thus the stop lid 3 is partly inside and partly outside of the journal box housing. The lid 3 has defined therein two spaced generally identical tapered wedge sockets 11. Each wedge socket contains a wedge 12 which is thrust into engagement with the thickened curved inner portion 13 of the journal box below the port by a coil spring 14 which encircles the spring stud 15. The spring cap 16 is threaded in the upper outer end of the wedge socket and seats against the spring cap washer 17. When the spring cap is screwed home, it exerts a pressure on the coil spring which in turn applies yielding pressure on the coil spring which in turn applies yielding pressure to the wedge to lock the elements in position with the lid stop locked in place.

Any tendency toward upward movement of the lid 3 resulting from the downward pressure of the spring applied to the wedge is resisted by the interlock between the wall of the box and the seal 5 and also by the lid bolts 6. The yielding pressure of the wedge tends to hold the lid seal 5 snugly against the walls of the journal box to prevent oil leakage. It will be noted that there are two of these wedge sockets, one on either side of the journal box.

Centrally of the journal box lid on the side opposite from the wedge sockets, the journal box carries a flange 18 in which is socketed a stop pad 19, preferably of elastomeric material. This stop pad is faced by an impact plate 20 which is centrally recessed as indicated and held in place by screw and bolt combination 21. A recess 22 at the back of the pad 19 in line with the bolt 21 permits the impact plate 20 to be displaced outwardly by contact with the end of the axle 31 without transmitting an uncushioned shock to the stop.

Between the wedge sockets 11 is an oil filler hole 23 closed by an oil plug 24 which carries a dip stick 25. The plug 24 is threaded in the filler hole 23, being equipped with the usual seal and may be unscrewed when it is desired to check depth of oil in the housing or add oil.

In order to limit downward movement of the wedge, the wedge retaining pin or tension member 26 is carried by the spring cap 16 and has a head 27 which limits downward movement of the wedge.

In assembly, the usual lid and its hinge pin is removed. The combined lid and journal stop is assembled with the spring cap unscrewed. Under these circumstances the cap, the tension member or wedge retaining pin are manually drawn upwardly until the wedge contacts the limiting shoulder 28 adjacent the upper end of the wedge aperture and below the threaded portion thereof. This draws the wedge up high enough in the combined lid and journal stop so that the inner portion of the lid, that is the lug 29 and the flange and stop pad assembly may be inserted through the door or port into the box. The lid is positioned by the operator so that the seal 5 engages the rim about the port as shown in FIGURE 2. Then the lid bolts 6 are put in position with the head bolts taking the place of the usual hinge pin and the nuts are tightened up enough to hold the seal in position. Then the cap 16 is screwed home against the shoulder 28. As this takes place, that is as the cap is screwed in, the wedge comes in contact with the thickened portion 13 of the journal box and as spring pressure increases, the wedge is forced into position wedging between the lug 29 and the thickened portion 13, thus additionally drawing the cap or closure into seated position and exerting additional pressure on the seal. A tendency if any toward upward movement of the cap as a result of the spring pressure is completely overcome by the hook and the bolt 6.

The wedge 12 may have a flat side 30 in opposition to the flat wall of the lug 29. Other shape of wall and wedge might be used. However, the particular shape of the wedge is not important and the wedge might be round or oval so long as it is tapered to provide the wedging action.

I claim:
1. In combination a railroad car axle journal box, a closure adapted to engage the outer wall of the box to close a port therein, a lug extending downwardly from the closure to a point below the lower extremity of the closure, a wedge and means for biasing it downwardly along the lug to engage the inner wall of the box.

2. In combination a railroad car axle journal box, a closure adapted to engage the outer wall of the box to close a port therein, a stop pad projecting inwardly from the closure, a lug extending downwardly from the closure to a point below the lower extremity of the closure, a wedge and means for biasing it downwardly along the lug to engage the inner wall of the box.

3. In combination, a railroad car axle journal box, a port therethrough a closure adapted to engage the outer wall of the box to close the port, means adjacent the upper and the lower boundaries of the closure for holding it in seated port closing position, the means adjacent the upper boundary of the closure including means to inhibit upward movement of the closure, the means adjacent the lower boundary of the closure including a lug extending downwardly from the inside wall of the closure to a point below the port, a wedge and yielding means for biasing it downwardly in wedging action between the lug and the inner wall of the box.

4. In combination, a railroad car axle journal box, a port therethrough a closure adapted to engage the outer wall of the box to close the port, means adjacent the upper and the lower boundaries of the closure for holding it in seated port closing position, the means adjacent the upper boundary of the closure including means to inhibit upward movement to the closure, the means adjacent the lower boundary of the closure including a lug extending downwardly from the inside wall of the closure to a point below the port, an aperture extending through the closure open at its upper end on the outside and its lower end on the inside face of the closure, a wedge adjacent the lower end of the aperture, means in the aperture to yieldingly force the wedge into wedging contact between the lug and the inner wall of the box.

5. In combination, a railroad car axle journal box, a port therethrough a closure adapted to engage the outer wall of the box to close the port, means adjacent the upper and the lower boundaries of the closure for holding it in seated port closing position, the means adjacent the upper boundary of the closure including means to inhibit upward movement of the closure, the means adjacent the lower boundary of the closure including a lug extending downwardly from the inside wall of the closure to a point below the port, an aperture extending through the closure open at its upper end on the outside and its lower end on the inside face of the closure, a wedge adjacent the lower end of the aperture, means in the aperture to yieldingly force the wedge into wedging contact between the lug and the inner wall of the box, there being two said apertures and wedges, a stop pad projecting inwardly from the closure along an axis intersecting the closure between said apertures.

6. In combination, a closure for railroad car axle journal boxes adapted to seat on the outer wall of a box to close a port therein, an elongated aperture extending through the closure open at upper end on the outside, at the lower end on the inside of the closure, a tension member extending through and projecting at both ends beyond the aperture, a wedge encircling the lower end of the tension member, a cap rigidly mounted on the upper end of the tension member, threaded on the closure, closing the upper end of the aperture and headed at its lower end to limit downward movement of the wedge.

7. In combination, a closure for railroad car axle journal boxes adapted to seat on the outer wall of a box to close a port therein, an elongated aperture extending through the closure open at upper end on the outside, at the lower end on the inside of the closure, a tension member extending through and projecting at both ends beyond the aperture, a wedge encircling the lower end of the tension member, a cap rigidly mounted on the upper end of the tension member, threaded on the closure, closing the upper end of the aperture and headed at its lower end to limit downward movement of the wedge, a compression spring encircling the tension member adapted to be compressed between the cap and the wedge to bias the wedge downwardly for wedging action.

8. In combination, a lid adapted to engage the walls of a ported receptacle to close the port, a socket extending through the lid along a line inclined to the plane of the port, a wedge and spring assembly in the socket, the wedge being so positioned as to be within the receptacle when the lid is closed, means for biasing the wedge into contact with an inner wall of the receptacle to cam the lid in place.

9. In combination, a ported railroad car axle journal box, a hinge boss above the port, a port lid adapted to engage the periphery of the port to close the box and a tension screw interposed between the hinge boss and the lid biasing the lid into position closing the port, an apertured lug extending inwardly from the lid into the box terminating at a point below the port, a wedge and spring assembly socketed in the lug, means for applying pressure on the spring to urge the wedge downwardly between the inner wall of the box below the door and the lug.

10. A lid for railroad car axle journal boxes which includes a closure adapted to engage the outer wall of the box to close a port therein, an aperture extending through the closure open at its lower end on one side of the closure, open at its upper end to the other side of the closure, a cap threaded in and closing the outside end of the closure, a retaining pin extending downwardly through the closure from the cap, a wedge loosely carried by the pin, a spring encircling the pin adapted to be compressed between the cap and the wedge, the length of the spring under compression being less than the distance between the cap and the lower end of the retaining pin.

11. In combination, a closure for railroad car axle journal boxes adapted to seat on the outer wall of a box to close a port therein, an elongated aperture extending through the closure open at the upper end on the outside and at the lower end on the inside of the closure, a wedge retaining member extending through and projecting at both ends beyond the aperture, a wedge encircling the lower end of the retaining member, a cap supporting the upper end of the tension member, threaded in the closure, closing the upper end of the aperture and headed at its lower end to limit downward movement of the wedge, a compression spring encircling the tension member adapted to be pressed between the cap and the wedge to bias the wedge downwardly for wedging action.

12. In combination, a car axle journal box having an open port, a lid in register with said port, means carried by the lid contained within the journal box for positively locking the lid into sealing register with the walls of the port, said means including a wedge carried by the lid, yielding means for biasing the wedge downwardly into camming contact with the inner wall of the box, an impact plate extending inwardly from the lid masking the positive locking means.

13. In combination, a railroad car axle journal box having a port for access thereto, a lid adapted to mask said port, means adjacent the top of the port and outside of the box for resisting movement of the upper portion of the lid, positive means adjacent the bottom of the port and inside the box for biasing the lid into firm contact with the walls of the box surrounding the port, said means including a wedge adapted to engage the inner wall of the box and yielding means for urging it into camming contact, an impact plate extending inwardly from the lid masking the positive locking means.

References Cited in the file of this patent

UNITED STATES PATENTS

| | | |
|---|---|---|
| 298,171 | Carr | May 6, 1884 |
| 1,095,737 | Reed | May 5, 1914 |
| 1,123,149 | Streeter | Dec. 29, 1914 |
| 1,458,741 | Barrows | June 12, 1923 |
| 2,250,853 | Buckius | July 29, 1941 |

FOREIGN PATENTS

| | | |
|---|---|---|
| 17,439 | Great Britain | 1900 |